United States Patent
Belanger et al.

(10) Patent No.: US 11,260,833 B2
(45) Date of Patent: Mar. 1, 2022

(54) DOLLY ASSEMBLY FOR A CONVEYOR SYSTEM

(71) Applicant: Motor City Wash Works, Inc., Wixom, MI (US)

(72) Inventors: Lionel Belanger, Northville, MI (US); Robert J. Wentworth, Farmington Hills, MI (US); Douglas J. Calvin, Livonia, MI (US)

(73) Assignee: Motor City Wash Works, Inc., Wixom, MI (US)

( * ) Notice: Subject to any disclaimer, the term of this patent is extended or adjusted under 35 U.S.C. 154(b) by 0 days.

(21) Appl. No.: 16/722,891

(22) Filed: Dec. 20, 2019

(65) Prior Publication Data

US 2021/0188222 A1   Jun. 24, 2021

(51) Int. Cl.
*B60S 13/00*   (2006.01)

(52) U.S. Cl.
CPC .................................... *B60S 13/00* (2013.01)

(58) Field of Classification Search
CPC .. B66F 9/00; B66F 9/195; B60S 13/00; F16G 15/02; F16G 15/04
See application file for complete search history.

(56) References Cited

U.S. PATENT DOCUMENTS

| | | | |
|---|---|---|---|
| 1,411,836 A * | 4/1922 | Bond | B60C 27/08 |
| | | | 59/85 |
| 1,456,361 A * | 5/1923 | Clark | F16G 15/02 |
| | | | 59/87 |
| 1,966,665 A * | 7/1934 | Gourley | F16G 15/04 |
| | | | 24/582.13 |
| 2,175,504 A * | 10/1939 | Ehmann | F16G 15/02 |
| | | | 59/85 |
| 2,382,344 A | 8/1945 | Pierre | |
| 2,398,898 A | 4/1946 | Pierre | |
| 2,833,152 A | 5/1958 | Hedlund et al. | |

(Continued)

FOREIGN PATENT DOCUMENTS

DE   3721729 A1   1/1989

OTHER PUBLICATIONS

Communication dated May 6, 2021 enclosing the Extended European Search Report dated Apr. 26, 2021 for European Patent Application No. 20214294.9.

*Primary Examiner* — Jason L Vaughan
(74) *Attorney, Agent, or Firm* — Howard & Howard Attorneys PLLC

(57) ABSTRACT

A number of dolly assemblies are connected in series with chain linkage sections to form an endless conveyor chain for the dolly assemblies to move objects along a track. Each dolly assembly includes a link attachment and a wheel assembly supported by the link attachment. The link attachment includes a base and a body portion. The body portion presents an open-loop partially surrounding an interior and extending between a pair of ends. The ends are spaced from one another to define an opening to the interior therebetween. The pair of ends are also formed in toward the interior to partially surround a respective pocket. Each pocket is configured to receive a portion of an endlink of a respective chain linkage section therein, and each one of the formed ends functions to prevent the endlink of the respective chain linkage section from becoming unhooked from the body portion.

12 Claims, 5 Drawing Sheets

(56) References Cited

U.S. PATENT DOCUMENTS

| | | | |
|---|---|---|---|
| 3,027,615 A * | 4/1962 | Forney | F16G 15/04 |
| | | | 24/116 R |
| 3,490,228 A * | 1/1970 | Gower | F16G 15/04 |
| | | | 59/93 |
| 3,596,605 A | 8/1971 | Shelstad | |
| 3,712,456 A | 1/1973 | Kincaid | |
| D278,920 S | 5/1985 | Wichman | |
| 5,001,988 A | 3/1991 | Agathos | |
| 5,133,179 A | 7/1992 | Bernt et al. | |
| 5,535,796 A * | 7/1996 | Line | B27L 1/122 |
| | | | 144/208.7 |
| 5,966,924 A | 10/1999 | Schulte-Feldmann | |
| 6,668,731 B2 | 12/2003 | Calisi et al. | |
| 8,113,124 B2 | 2/2012 | Smock et al. | |
| 8,985,029 B2 | 3/2015 | Turner | |
| 9,212,508 B2 | 12/2015 | Loughlin et al. | |
| 9,452,740 B1 | 9/2016 | Fazio et al. | |
| 2016/0264103 A1* | 9/2016 | Fazio | B65G 39/20 |
| 2018/0281751 A1 | 10/2018 | Belanger et al. | |
| 2019/0367281 A1 | 12/2019 | Fazio et al. | |

* cited by examiner

DOLLY ASSEMBLY FOR A CONVEYOR SYSTEM

TECHNICAL FIELD

The present disclosure is related to a dolly assembly for a conveyor system.

BACKGROUND

Conveyor systems for vehicles, such as automobiles and the like, are used in car washes and other applications to move the vehicle across a horizontal surface. A track extends along the horizontal surface. A dolly may rise out of an opening at an entrance end of the conveyor assembly to engage a tire of the vehicle. The dolly is driven by a chain to advance the vehicle along the conveyor until the vehicle exits and the dolly drops below the horizontal surface to eventually return to the entrance end of the conveyor.

SUMMARY

A first aspect of the disclosure provides a log chain link attachment for connection to end links of a chain linkage section and for connection to a wheel assembly to provide a dolly assembly, the log chain link attachment includes a body portion. The body portion presents an open-loop that partially surrounds an interior and extends between a pair of ends. The pair of ends are spaced from one another to define an opening to the interior therebetween. The pair of ends are also formed in toward the interior to partially surround a respective pocket. Each one of the pockets is configured to receive a portion of an endlink of a respective chain linkage section therein, and each one of the formed ends is configured to prevent the endlink of the respective chain linkage section from becoming unhooked from the body portion.

In another aspect of the disclosure, a dolly assembly is provided for moving an object along a track. The dolly assembly includes a log chain link attachment and a wheel assembly. The log chain link attachment is configured for connection to end links of a chain linkage section. The log chain link attachment includes a body portion presenting an open-loop that partially surrounds an interior and extends between a pair of ends. The pair of ends are spaced from one another to define an opening to the interior therebetween. The pair of ends are also formed in toward the interior to partially surround a respective pocket. Each one of the pockets is configured to receive a portion of an endlink of a respective chain linkage section therein, and each one of the formed ends is configured to prevent the endlink of the respective chain linkage section from becoming unhooked from the body portion.

The wheel assembly is supported by the log chain link attachment. At least one wheel assembly is configured to be in rolling contact with the track as the dolly assembly moves an object along the track.

The above features and advantages and other features and advantages of the present teachings are readily apparent from the following detailed description of the best modes for carrying out the present teachings when taken in connection with the accompanying drawings.

DETAILED DESCRIPTION

Figure 1:
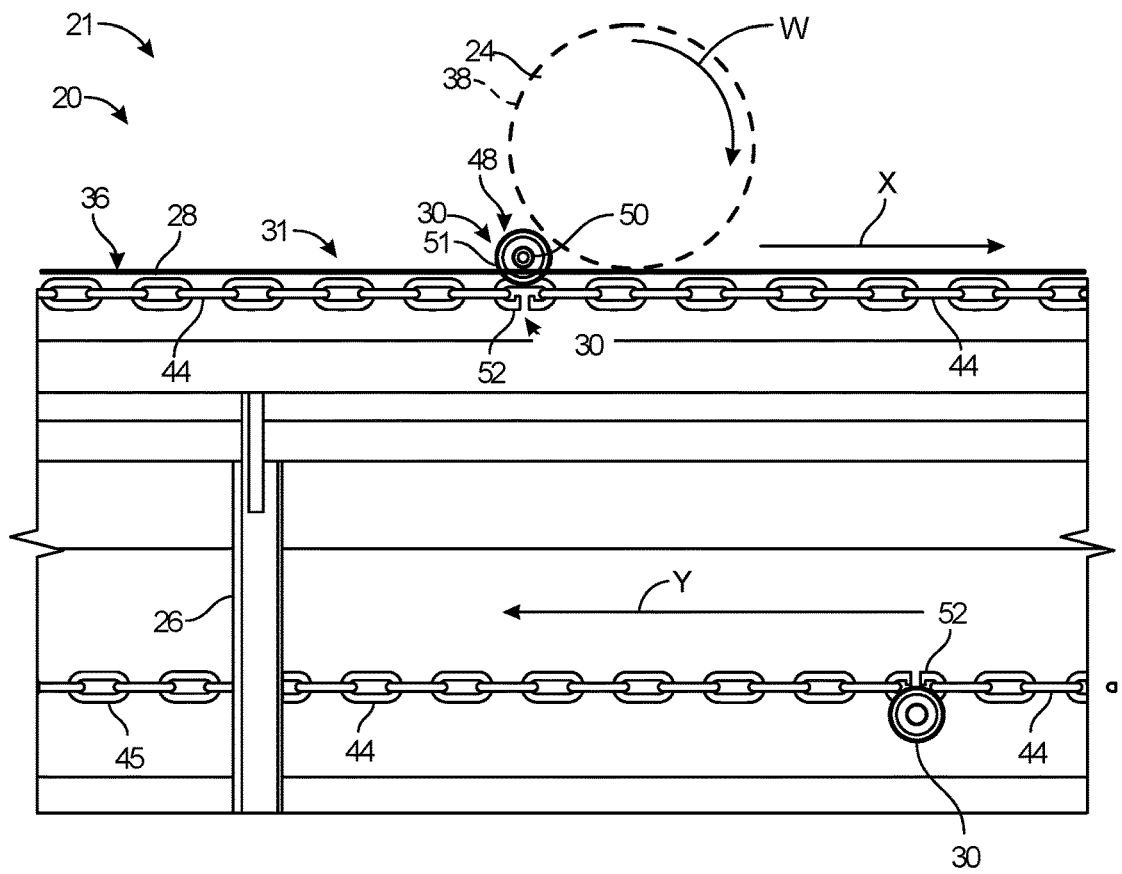
FIG. 1 is a schematic side view of a conveyor system for use with a car wash, with the conveyor system including a conveyor system that includes a plurality of dolly assemblies, driven by a chain, with a tire of a vehicle supported by the conveyor system with the tire being moved by a roller of the dolly assembly.

Referring to the drawings, wherein like reference numbers refer to like components throughout the several Figures, a conveyor system 20 for use with a vehicle washing system is shown schematically in FIG. 1. The conveyor system 20 is configured to convey a vehicle 24 through the vehicle washing system 21.

The conveyor system 20 includes a support structure 26, a track 28, a drive assembly 31, and the like. The support structure 26 operatively supports the track 28 and the drive assembly 31. The track 28 presents a support surface 36 that is configured to rollingly support tires 38 of the vehicle 24, as the tires 38 roll along the support surface 36. The conveyor system 20 extends between opposing ends. As known to those of skill in the art, a pair of sprockets may be disposed proximate the opposite ends of the conveyor system 20.

The drive assembly includes a plurality of chain linkage sections 44 and a plurality of dolly assemblies 30. The dolly assemblies 30 are configured to be arranged in series, such that adjacent dolly assemblies are linked together by a respective chain linkage section 44. Therefore, the plurality of dolly assemblies 30 and the plurality of chain linkage sections 44 are linked together in alternating and repeating relationship to one another to provide an endless conveying chain 45. As shown in FIG. 1, the endless conveying chain 45 extends in a continuous loop that may extend about the pair of sprockets. As known to those of skill in the art, the sprockets may be driven or otherwise rotated by a motor to move the endless conveying chain 45. The endless conveying chain 45 is operatively disposed opposite the support surface 36, i.e., beneath the track 28. With reference to FIG. 1, in response to moving the endless conveying chain 45, each dolly assembly 30 is configured to move, i.e., roll, along the support surface 36 of the track 28, while pushing a tire 38 of the vehicle 24, to the edge of the track 28.

Figure 2:
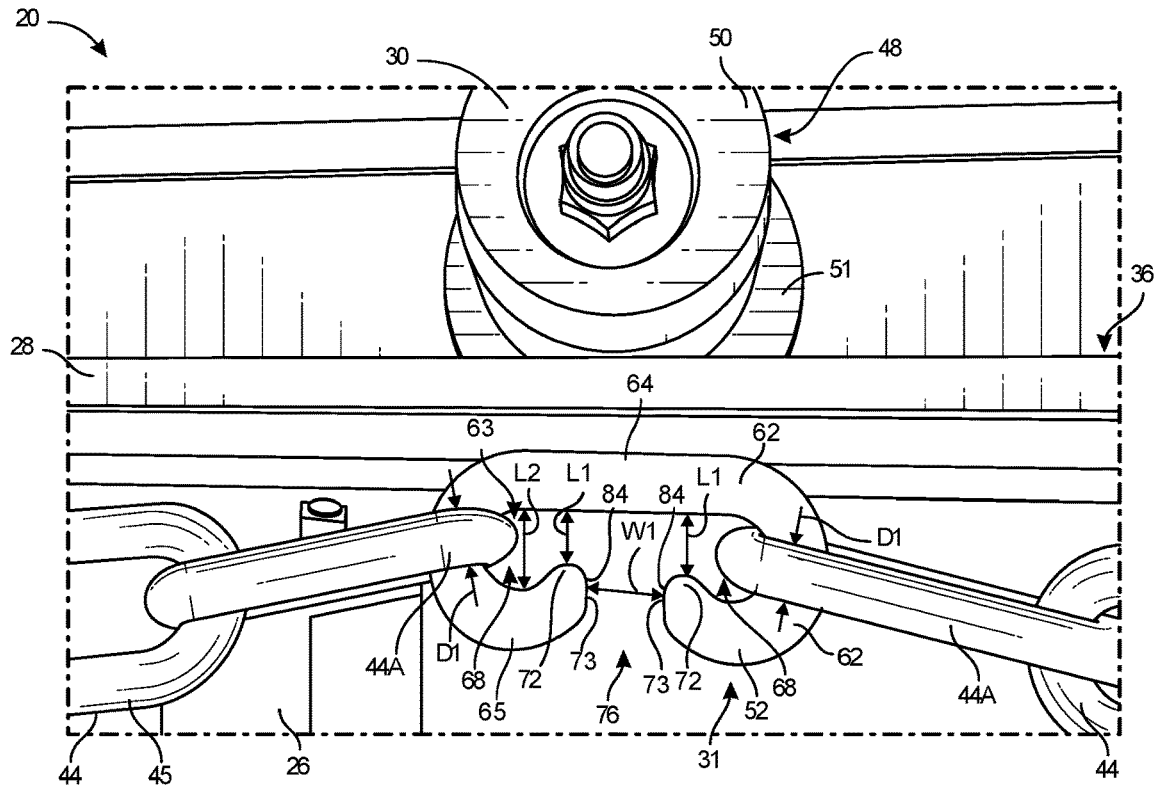
FIG. 2 is a schematic side view of a portion of a conveyor system including the dolly assembly including a first embodiment of a link attachment.

Referring to FIGS. 1 and 2, each dolly assembly 30 may include a wheel assembly 48 and a log chain link attachment (link attachment) 52. The wheel assembly 48 may include at least one first roller 50 and at least one second roller 51. The first roller 50 is configured to roll along the support surface 36 in response to movement of the endless conveying chain 45, such that the second roller 51, in turn, is caused to push against the respective tire 38, causing the tire 38 to roll (arrow W) along the support surface 36 and the vehicle 24 to move in a forward direction (arrow X). The second roller 51 extends into the channel defined along the track 28 such that the second roller 51 is free to rotate in a direction opposite the rotation (W) of the tire 38. As each dolly assembly 30 reaches the edge of the track 28, the dolly assembly 30 drops below the track 28 and is able to continue to move with the chain linkage sections 44 about the respective sprocket, where the respective dolly assembly 30 is returned in the opposite direction (arrow Y), as is known to those skilled in the art.

Figure 3:
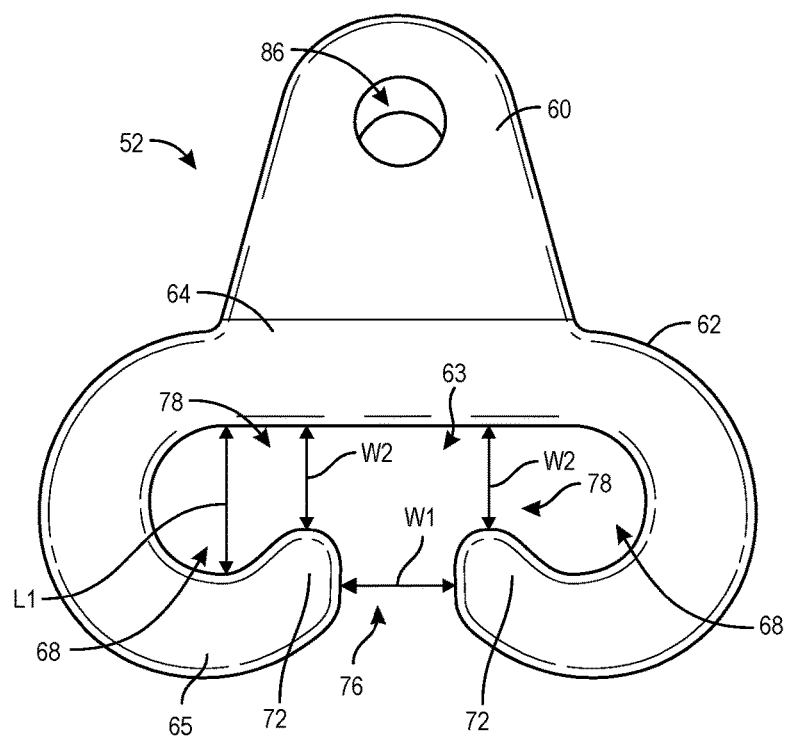
FIG. 3 is a schematic side view of the link attachment of the dolly assembly of FIG. 2.
Figure 4:
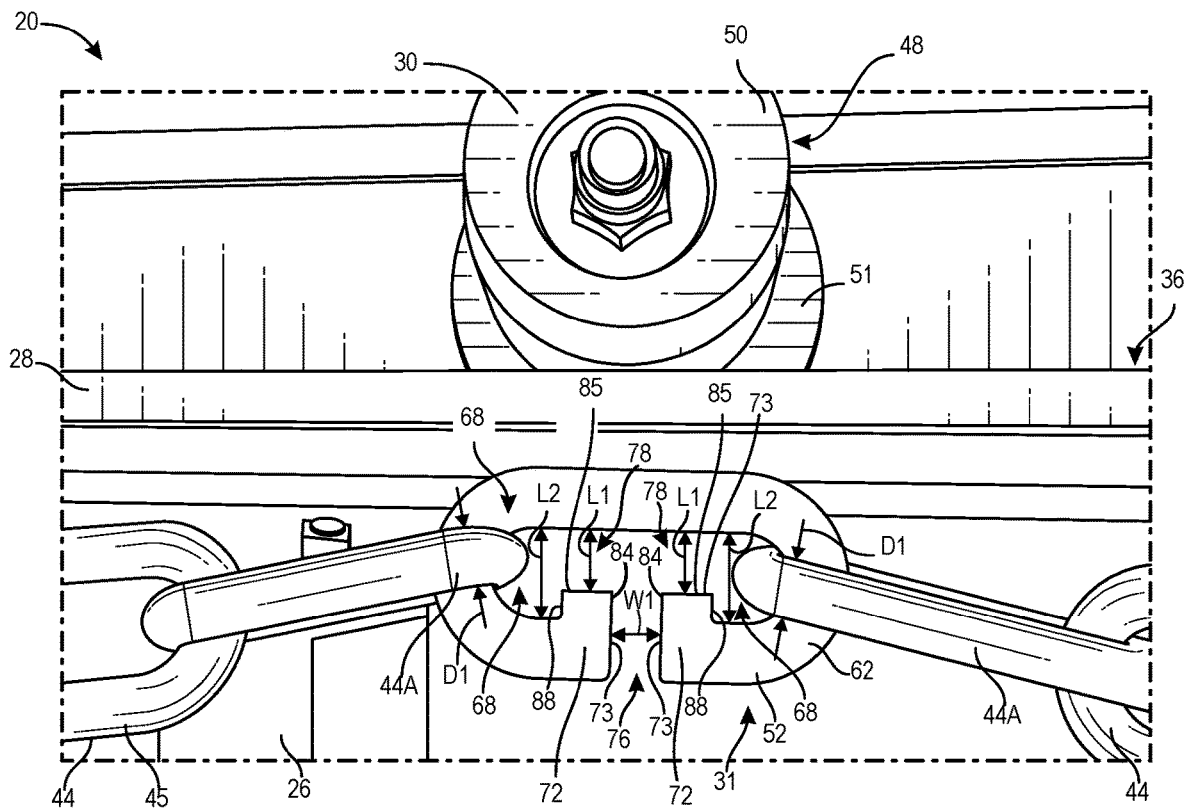
FIG. 4 is a schematic side view of a portion of a conveyor system including the dolly assembly including a first embodiment of a link attachment.
Figure 5:
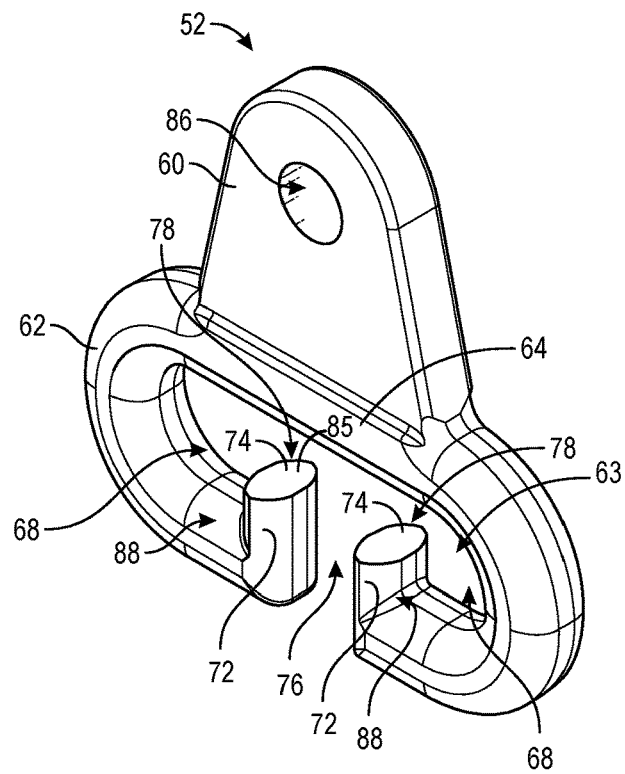
FIG. 5 is a schematic perspective view of the link attachment of the dolly assembly of FIG. 4.
Figure 6:
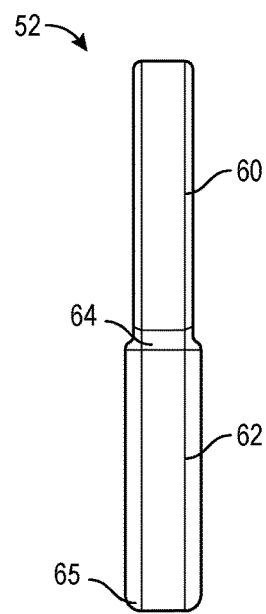
FIG. 6 is a schematic end view of the link attachment of FIG. 4.

Referring again to FIGS. 1 and 2, the link attachment 52 operatively connects the dolly assembly 30 to the adjacent chain linkage sections 44. Referring now to FIGS. 2-3, an exemplary first embodiment of the link attachment 52 is shown. The link attachment 52 includes a body portion 62 and a base 60. The base 60 extends from the first side of the body portion 62. The base 60 is configured for attachment to the wheel assembly 48 of the dolly assembly. The base defines at least one thru-hole configured for receiving an axle of the wheel assembly 48 therein. The wheel assembly 48 is operatively attached to the base 60. The base 60 may define at least one thru-hole 86 configured for receiving an axle associated with the wheel assembly 48, as known to those of skill in the art. It should be appreciated that the base 60 may have one or more axles attached thereto, and that the rollers 50, 51 are attached to the axles.

With continuing reference to FIGS. 2-3, the body portion 62 presents an open-loop that partially surrounds an interior 63 and extends between a pair of ends 72. The pair of ends 72 are spaced from one another to define an opening 76 to the interior 63 therebetween. The pair of ends 72 are also formed inward, toward the interior 63, to partially surround a respective pocket 68. Each pocket 68 is configured to receive a portion of an endlink 44A of a respective chain linkage section 44 therein. Each one of the formed ends 72 is configured to prevent the endlink 44A of the respective chain linkage section 44 from becoming unhooked from the body portion 62.

Figure 7:
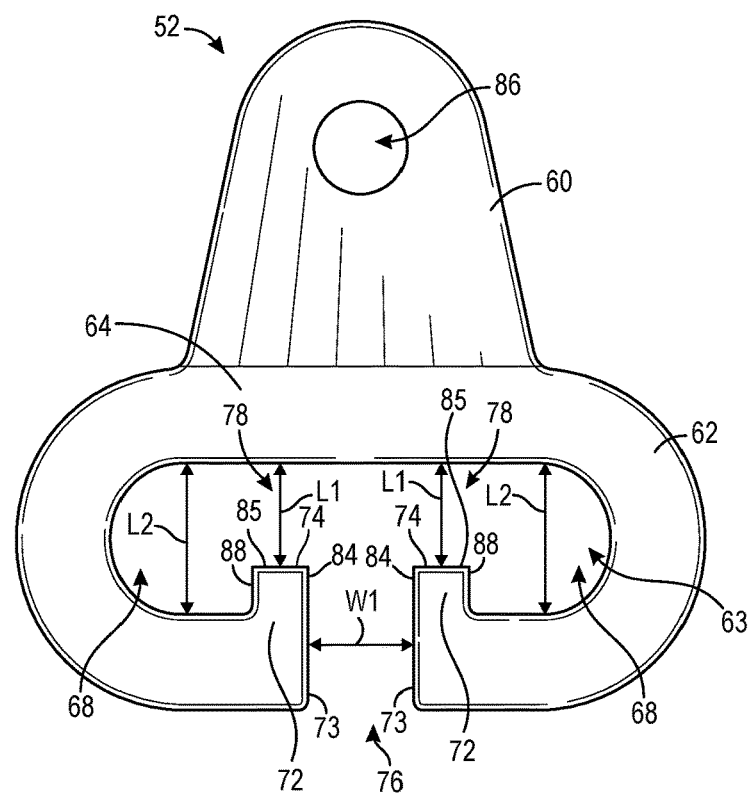
FIG. 7 is a schematic side view of the link attachment of FIG. 4.

The body portion 62 includes a first side 64 and a second side 65 in spaced and opposing relationship to one another. The formed ends 72 are disposed on the second side. Each one of the formed ends 72 presents a first edge portion 73 and a second edge portion 74. The first edge portions 73 are in spaced relationship to one another to define the opening 76 the interior therebetween. Each one of the second edge portions 74 is in spaced relationship to the first side 64 of the body portion 62 to define a respective gap 78 therebetween that opens between the opening 76 and the respective pocket 68. In the embodiment shown in FIGS. 2 and 3, the first and second edge portions 73, 74 are configured such that the formed ends 72 present a generally rounded or curved shape. Referring to the exemplary embodiment of the link attachment 52 shown in FIG. 7, the first and second edge portions 73, 74 are configured such that the ends 72 present a generally tapered or pointed shape.

Referring again to the embodiment shown in FIGS. 2 and 3, the first edge portions 73 are disposed in spaced relationship to one another at a narrowest width W1 of the opening 76. The narrowest width W1 of the opening 76 is the location where the distance between the first edge portions 73 is the smallest. Likewise, each one of the second edge portions 74 is in spaced relationship to the first side 64 of the body portion 62 at a narrowest span L1 of the respective gap 78. Said differently, the narrowest span of the opening 76 is where the distance between the first side 64 and the second edge portion 74, at the respective gap 78, is the smallest. Each pocket 68 has a depth L2 that is defined between the first side 64 and second side 65. The largest depth L2 of each pocket 68 is larger than the narrowest span L1 of the respective gap 78. It should be appreciated that, in order to allow passage into the pockets 68, a diameter D1 of the corresponding endlink 44A is at least smaller than the narrowest width W1 of the opening 76 and at least smaller than the narrowest span L1 of the respective gap 78. If there is slack in the endless chain 45, the formed ends 72 of the body portion 62 act as a barrier or a lip that prevents the endlink 44A from becoming dislodged from the respective pocket 68.

Accordingly, after attaching the endlink 44A to the body portion 62 of the link attachment 52, the endlink 44A will remain in place within the pocket 68 during assembly of the entire endless chain 45, and during use of the conveyor system 20, regardless of whether slack develops within one or more of the chain linkage sections 44 due to stretching and wear of the endlinks 44A during normal usage. The barrier to each pocket 68 of the body portion 62 is configured, as is, to keep the endlink 44A of the chain linkage sections 44 within the pocket 68, without the addition of other materials or processes, e.g., no additional pieces of metal or plastic are required to be welded or otherwise attached to the link attachment 52 to close the opening. Such additional pieces of metal would add additional cost to complete the assembly and/or repair of the endless chain 45 and would add additional cost in terms of the added materials.

With continuing reference to FIGS. 2-3, the pockets 68 may be rounded to present a generally C-shape. Each pocket 68 is configured to receive a portion of an endlink 44A of a respective chain linkage section 44 therein.

With reference to FIGS. 4-7, a third exemplary embodiment of a link attachment 52 is shown. In the body portion 62 shown in FIGS. 4-7, each one of the first edge portions 73 is a first edge surface 84 and each one of the second edge portions 74 is a second edge surface 85. Additionally, each one of the formed ends 72 further presents a third edge surface 88 that extends from the second edge surface 85, opposite the first edge surface 84, and away from the first side 64 of the body portion 62. Accordingly, the second edge surface 85 is disposed between the first edge surface 84 and the third edge surface 88. The first edge surface 84 and the respective third edge surface 88 may extend in generally perpendicular relationship to the second edge surface 85. As such, the first, second, and third edge surfaces 84, 85, 88 combine to form an end 72 having a partially squared-shape. It should be appreciated that the first, second, and third edge surfaces 84, 85, 88 may form ends 72 having other shapes.

Figure 8:
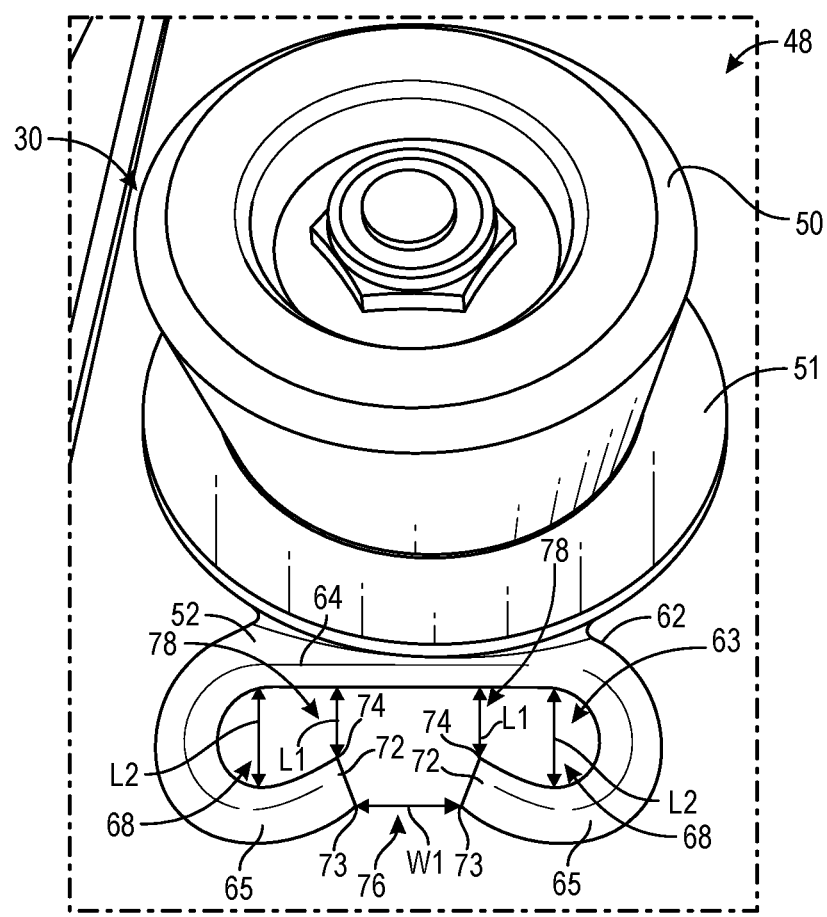
FIG. 8 is a schematic side view of a portion of a dolly assembly including a third embodiment of a link attachment.
Figure 9:
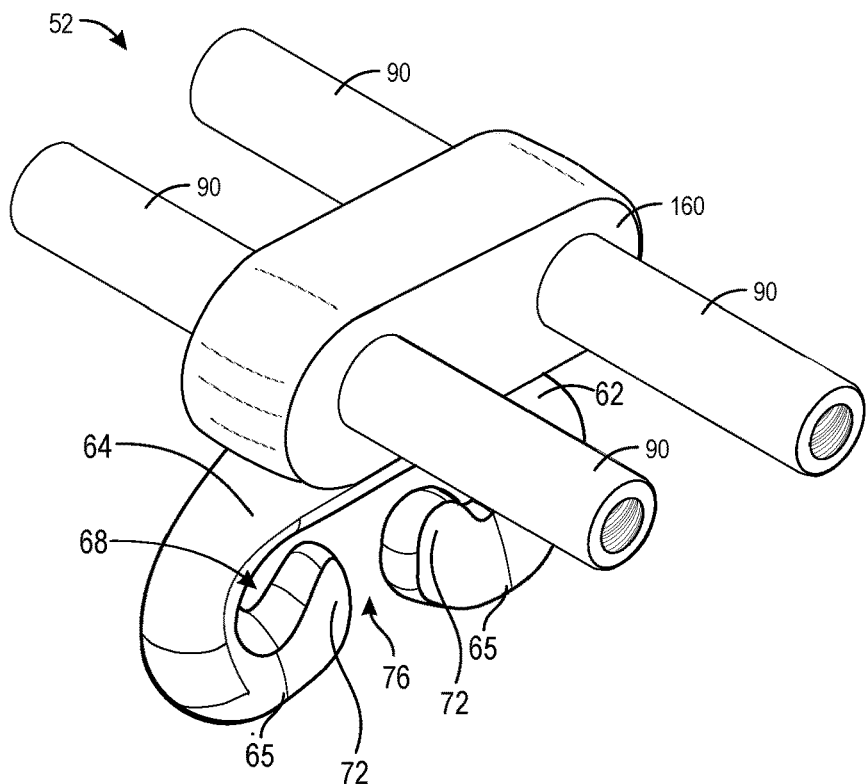
FIG. 9 is a schematic perspective view of another embodiment of a link attachment for a dolly assembly.
Figure 10:
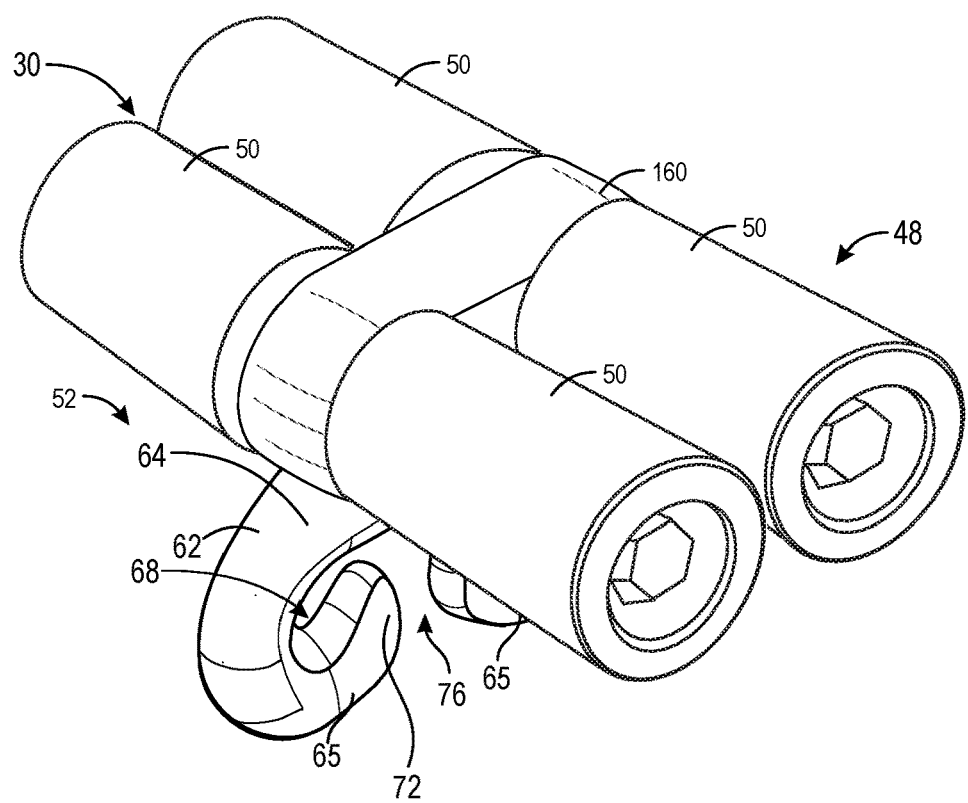
FIG. 10 is a schematic perspective view of a dolly assembly with the link attachment of FIG. 9.

With reference to FIGS. 9 and 10, a fourth exemplary embodiment of a link attachment is shown at 158. The link attachment 158 includes a base 160 and the body portion 62 shown in FIGS. 2 and 3. It should be appreciated that the body portion 62 is not limited that which is shown in FIGS. 2 and 3, and may be the exemplary embodiments shown in FIGS. 4-7 and in FIG. 8. Referring again to FIGS. 9 and 10, the base 160 is configured for attachment to the wheel assembly 48 of the dolly assembly 30. At least one axle 90 is operatively attached to the base 160. The axle 90 may be attached to the base 160 by way of a threaded attachment, welding, forging, and the like. As such, the axle 90 may be affixed to the base 160 such that the axle 90 does not rotate. With reference to FIGS. 9 and 10, two pairs of axles 90 extend from opposing sides of the base 160. As shown in FIG. 10, a wheel 50 is rollingly attached to each one of the axles 90 such that the body 160 is sandwiched between four wheels 50. It should be appreciated that the base 60 may have more or less axles 90 and wheels 50 than described herein.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A log chain link attachment for connection to end links of a chain linkage section and for connecting to a wheel assembly of a dolly assembly moveable along a track, the log chain link attachment comprising:
    a body portion including a first side and a second side disposed in spaced, opposing relationship with respect to each other, said first side adapted to interconnect with the wheel assembly;
    said second side including a pair of fingers, each one of said pair of fingers having a pair of ends that extend toward each other such that said pair of fingers define a respective pocket between each of said pair of fingers and said first side of said body portion such that each pocket has a depth so as to define an interior;
    said pair of ends including a first edge portion and a second edge portion;
    said first edge portion of each of said pair of ends disposed in spaced relationship with respect to each other so as to define an opening to said interior between said pair of ends at the narrowest width of said opening to said interior;
    each of said second edge portions disposed in spaced relationship with said first side of said body portion so as to define a gap therebetween and such that said gap is at the narrowest span between said pair of ends and said first side of said body portion;
    wherein the largest depth of each of said pockets is larger than the narrowest span of the respective gap between said pair of second edge portions and said first side of said body portion such that each one of the pockets is configured to receive a portion of a respective chain linkage section and each one of said first and second ends of said pair of fingers acts to prevent the end link of the respective chain linkage section from becoming unhooked from said body portion of said log chain link attachment independent of the orientation of the body portion relative to the track.

2. The log chain link attachment as set forth in claim 1, wherein each one of the first edge portions defines a first edge surface;
    wherein each one of the second edge portions defines a second edge surface; and
        wherein each one of said pair of ends further presents a third edge surface, extending from the second edge surface, opposite the first edge surface, away from the first side of the body portion.

3. The log chain link attachment as set forth in claim 2, wherein the first edge surface and the respective third edge surface extend in generally perpendicular relationship to the second edge surface.

4. The log chain link attachment as set forth in claim 1, further comprising a base extending from the first side of the body portion, opposite the interior;
    wherein the base is configured for attachment to the wheel assembly of the dolly assembly.

5. The log chain link attachment as set forth in claim 4, wherein the base defines at least one thru-hole configured for receiving an axle of the wheel assembly therein.

6. The log chain link attachment as set forth in claim 1, wherein each one of the pair of ends presents at least one of a rounded shape, a squared shape, and a tapered shape.

7. A dolly assembly for moving an object along a track, the dolly assembly comprising:
    a log chain link attachment configured for connection to end links of a chain linkage section, and at least one wheel assembly supported by the log chain link attachment, wherein the at least one-wheel assembly is configured to be in rolling contact with the track as the dolly assembly moves an object along the track;
    the log chain link attachment including a body portion including a first side and a second side disposed in spaced, opposing relationship with respect to each other, said first side adapted to interconnect with the wheel assembly;
    said second side including a pair of fingers, each one of said pair of fingers having a pair of ends that extend toward each other such that said pair of fingers define a respective pocket between each of said pair of fingers and said first side of said body portion such that each pocket has a depth so as to define an interior;
    said pair of ends including a first edge portion and a second edge portion;
    said first edge portion of each of said pair of ends disposed in spaced relationship with respect to each other so as to define an opening to said interior between said pair of ends at the narrowest width of said opening to said interior;
    each of said second edge portions disposed in spaced relationship with said first side of said body portion so as to define a gap therebetween and such that said gap is at the narrowest span between said pair of ends and said first side of said body portion;
    wherein the largest depth of each of said pockets is larger than the narrowest span of the respective gap between said pair of second edge portions and said first side of said body portion such that each one of the pockets is configured to receive a portion of a respective chain linkage section and each one of said first and second ends of said pair of fingers acts to prevent the end link of the respective chain linkage section from becoming unhooked from said body portion of said log chain link attachment independent of the orientation of the body portion relative to the track.

8. The dolly assembly as set forth in claim 7, wherein each one of the first edge portions defines a first edge surface;
    wherein each one of the second edge portions defines a second edge surface; and
    wherein each one of the pair of ends further presents a third edge surface, extending from the second edge surface, opposite the first edge surface, away from the first side of the body portion.

9. The dolly assembly as set forth in claim 8, wherein the first edge surface and the respective third edge surface extend in generally perpendicular relationship to the second edge surface.

10. The dolly assembly as set forth in claim 7, further comprising a base extending from the first side of the body portion, opposite the interior;
    wherein the base is configured for attachment to the wheel assembly of the dolly assembly.

11. The dolly assembly as set forth in claim 10, wherein the base defines at least one thru-hole configured for receiving an axle of the wheel assembly therein.

12. The dolly assembly as set forth in claim 7, wherein each one of the pair of ends presents at least one of a rounded shape, a squared shape, and a tapered shape.

* * * * *